US009325778B2

(12) United States Patent
Maguire

(10) Patent No.: US 9,325,778 B2
(45) Date of Patent: Apr. 26, 2016

(54) WIRELESS DATA PRIVACY MAINTAINED THROUGH A SOCIAL NETWORK

(71) Applicant: Facebook, Inc., Menlo Park, CA (US)

(72) Inventor: Yael Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 146 days.

(21) Appl. No.: 13/843,155

(22) Filed: Mar. 15, 2013

(65) Prior Publication Data
US 2014/0280941 A1 Sep. 18, 2014

(51) Int. Cl.
G06F 15/173 (2006.01)
G06F 15/16 (2006.01)
H04L 29/08 (2006.01)
G06Q 10/06 (2012.01)
G06Q 50/00 (2012.01)
G06Q 10/10 (2012.01)

(52) U.S. Cl.
CPC ............... H04L 67/10 (2013.01); G06Q 10/06 (2013.01); G06Q 10/10 (2013.01); G06Q 50/01 (2013.01); H04L 67/1002 (2013.01); H04L 67/104 (2013.01); H04L 67/306 (2013.01)

(58) Field of Classification Search
CPC .... H04L 67/10; H04L 67/1002; H04L 67/104
USPC ......................................... 709/225, 204, 206
See application file for complete search history.

(56) References Cited

U.S. PATENT DOCUMENTS

| 8,799,304 | B2 | 8/2014 | Lunt et al. | |
| 8,819,851 | B1 * | 8/2014 | Johansson | H04L 63/0428 726/28 |
| 8,850,536 | B2 | 9/2014 | Liberman et al. | |
| 8,914,392 | B2 | 12/2014 | Lunt et al. | |
| 9,003,556 | B2 | 4/2015 | Fedorov et al. | |
| 9,015,856 | B2 | 4/2015 | Matus | |
| 2009/0117883 | A1 * | 5/2009 | Coffing et al. | 455/414.1 |
| 2011/0093709 | A1 * | 4/2011 | Lunt et al. | 713/168 |
| 2012/0211557 | A1 * | 8/2012 | Harris | 235/375 |

(Continued)

FOREIGN PATENT DOCUMENTS

KR 10-2012-0063686 A 6/2012
KR 1020120063686 A 6/2012

(Continued)

OTHER PUBLICATIONS

International Search Report and Written Opinion from International Application No. PCT/US2014/024778, 9 pages, Jul. 23, 2014.

*Primary Examiner* — Hieu Hoang

(74) *Attorney, Agent, or Firm* — Perkins Coie LLP

(57) ABSTRACT

In one embodiment, one or more servers providing an on-line service send a token to a first client computing device associated with a first user of the on-line service, the token being generated by the servers based at least in part on a user identifier of the first user; the serves receive the token from a second client computing device associated with a second user of the on-line service, the token being sent to the second client computing device from the first client computing device through a wireless connection; the servers verify the token based at least in part on the user identifier of the first user; the servers determine data accessible to the second user if the token is verified; the servers also send to the second client computing device at least some of the data accessible to the second user.

19 Claims, 5 Drawing Sheets

(56) References Cited

U.S. PATENT DOCUMENTS

| | | |
|---|---|---|
| 2012/0284335 A1 | 11/2012 | Chung |
| 2012/0330945 A1* | 12/2012 | Lunt et al. .................... 707/727 |
| 2012/0330995 A1* | 12/2012 | Muenkel ............... G06F 17/246 |
| | | 707/769 |
| 2013/0036459 A1 | 2/2013 | Liberman |
| 2013/0042326 A1* | 2/2013 | Matus ........................... 726/28 |
| 2013/0227011 A1* | 8/2013 | Sharma et al. ................ 709/204 |
| 2013/0325945 A1* | 12/2013 | Jayaram .................. H04L 51/32 |
| | | 709/204 |
| 2014/0214945 A1* | 7/2014 | Zhang .................. H04L 67/306 |
| | | 709/204 |
| 2014/0245461 A1* | 8/2014 | O'Neill et al. .................. 726/28 |

FOREIGN PATENT DOCUMENTS

| | | |
|---|---|---|
| KR | 10-2013-0005911 A | 1/2013 |
| KR | 1020130005911 A | 1/2013 |

\* cited by examiner

WIRELESS DATA PRIVACY MAINTAINED THROUGH A SOCIAL NETWORK

TECHNICAL FIELD

This disclosure generally relates to social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, each client computing device of one or more users of a social-networking system may connect to the social-networking system through a secured connection and acquire from the social-networking system a one-time token that is associated with a respective user. A first client computing device of a first user may send its token to a second client computing device of a second user through a peer-to-peer wireless network. The second client computing device may then send the token to the social-networking system. The social-networking system may verify that the token is associated with the first user. The social-networking system may look up a social graph and privacy settings of the first user to determine data accessible to the second user if the token is verified. The social-networking system may send at least some of the data accessible to the second user to the second client computing device. After the token is verified and the data accessible to the second user is determined, information sharing and interaction between the first and second client computing devices (and between the first and second users) may be facilitated through the social-networking system, instead of the peer-to-peer wireless network between the first and second client computing devices.

DESCRIPTION OF EXAMPLE EMBODIMENTS

Figure 1:
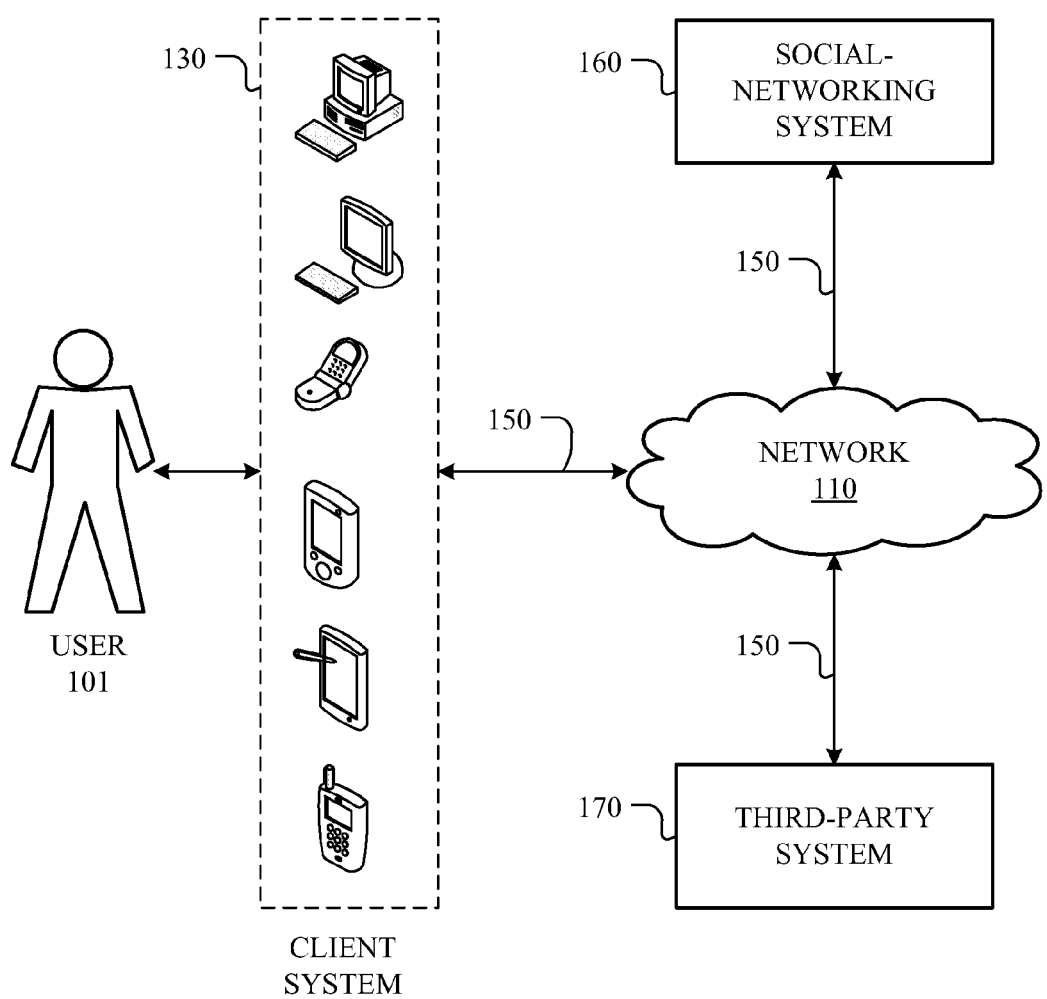
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. In particular embodiments, third-party system 170 may be a network-addressable computing system that can host websites and applications. Third-party system 170 may generate, store, receive, and send third-party system data, such as, for example and without limitation, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer. In particular embodiments, client system 130 may be an exercise equipment, an appliance, a car, a bicycle, a heart rate monitor, or a blood pressure monitor.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or 802.11, Worldwide Interoperability for Microwave Access (WiMAX), or wireless communication over TV whitespace), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN (e.g., Ethernet), a WLAN, a WAN, a WWAN, a MAN, a portion of the Internet, a portion of the PSTN, a cellular technology-based network (e.g., GSM, GPRS, UMTS, or LTE), a satellite communications technology-based network, another link 150, or a combination of two or more such links 150. Links 150 need not necessarily be the same throughout network environment 100. One or more first links 150 may differ in one or more respects from one or more second links 150.

Figure 2:
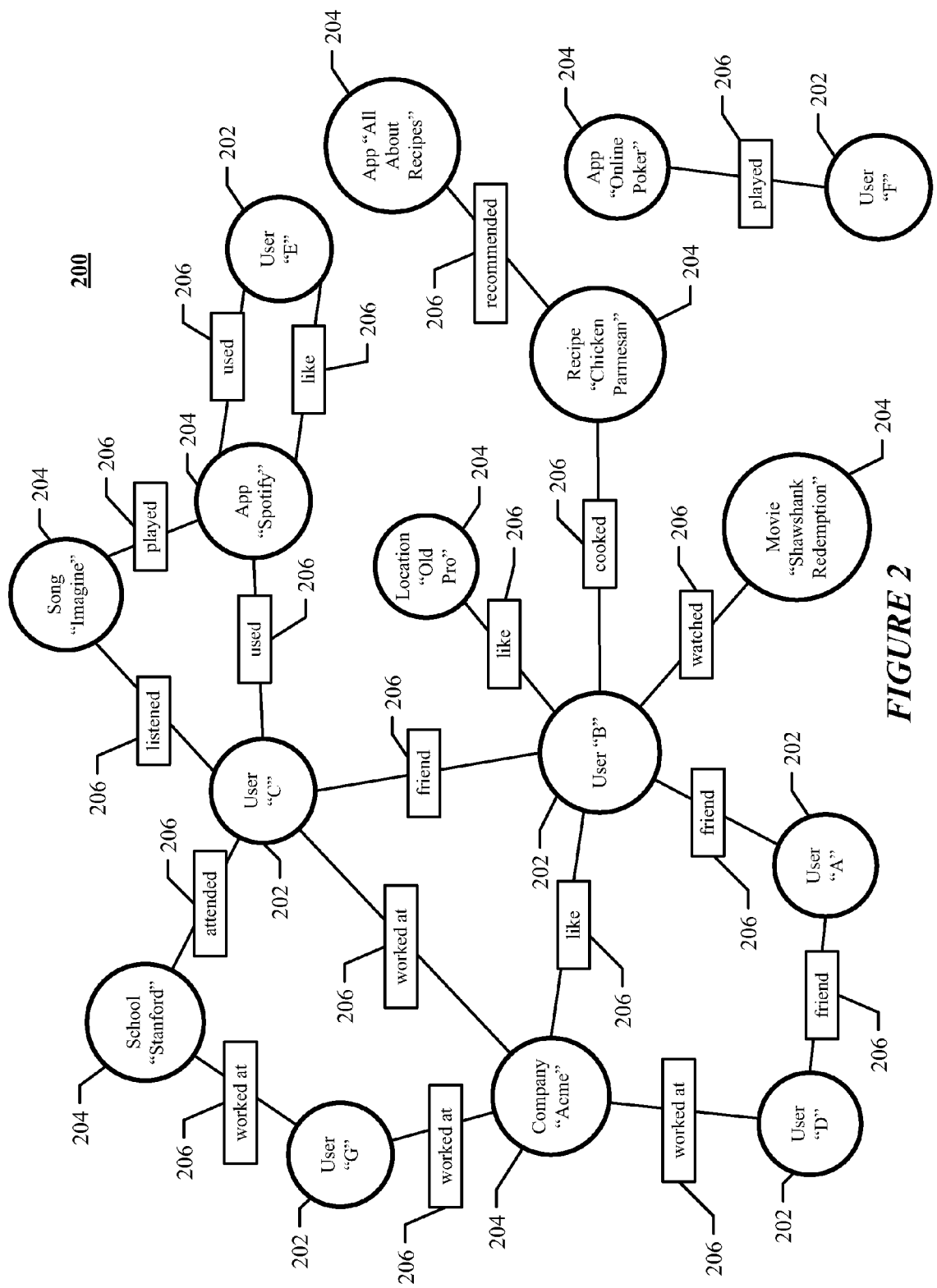
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops (or edges) required to traverse the social graph from one node to the other. A degree of separation between two nodes can be considered a measure of relatedness between the users or the concepts represented by the two nodes in the social graph.

The social-networking system may provide to a user frequently updated content based on recorded activities or actions that may be related to the user. In particular embodiments, the social-networking system may support a news-feed service. In particular embodiments, a news feed may comprise a data format including one or more news-feed stories. Each news-feed story may include content related to a specific subject matter or topic. In particular embodiments, the social-networking system may aggregate activities or actions related to a specific user action into a news-feed story. For example, a first user may post a photo to the social-networking system, while other users of the social-networking system may perform various activities or actions related to the photo. Other users may "like" the photo, post comments related to the photo, or tag one or more particular users to the photo. The social-networking system may aggregate activities related to the photo into a news-feed story comprising an image of the photo, a profile picture of the first user, a count of "likes" of the photo by other users, and one or more comments related to the photo. As for another example, a first user may check-in to a webpage (maintained by the social-networking system or a third-party system) corresponding to a place (e.g., a landmark, a restaurant, a department store). Other users of the social-networking system may "like" the check-in activity, or post comments related to the check-in activity. The social-networking system may aggregate activities related to the check-in activity into a news-feed story comprising a link and an image of the webpage, a profile picture of the first user, a count of "likes" of the check-in activity by other users, and one or more comments related to the check-in activity. The social-networking system may also aggregate into the news-feed story update to the webpage, or advertising related to the webpage (e.g., on-line coupons from a business related to the webpage). In particular embodiments, the social-networking may present a news feed including one or more news-feed stories to a viewing user. For example, an application (e.g., a web browser) or an operation system hosted by a client device of the viewing user may retrieve a news feed from the social-networking system and display the news feed in the application's user interface. The application may display each news-feed story in the news feed in a respective frame (e.g., an Hypertext Markup Language or HTML iFrame) in the application's user interface (or in the operating system's graphical user interface).

The social-networking system may aggregate activities or actions into news-feed stories based on social-graph information. For example, the social-networking system may aggregate for a viewing user a news feed including news-feed stories related to activities or actions performed by users who are within a specified degree of separation (e.g., within two degrees of separation) from the viewing user on the social graph. The social-networking system may aggregate activities or actions into news-feed stories based on privacy settings. For example, a user may specify which other users can access information of a particular activity performed by the user. The social-networking system may aggregate for a viewing user a news feed including news-feed stories related to activities accessible to the viewing user.

An on-line service may provide services and data to users of the on-line service. For example, as web-portal system may provide on-line services such as emails, games, shopping, news, weather forecast, stock quotes, sports scores, and so on. For another example, a social-networking website may provide on-line social-networking services such as wall posts, photo-sharing, event organization, messaging, games, or advertisements. An on-line service may ask a user to register with the on-line service with the on-line service to access services and data provided by the on-line service. The on-line service may also ask the user to set up a user credential (e.g., a user identifier and a password) for authenticating the user to access the on-line service. The user may access the on-line service on a client computing device by providing the user credential at a log-in user interface (of the on-line service) displayed by the client computing device (e.g., a log-in web page displayed by a web browser running on the client computing device). The on-line service may determine how particular information associated with a particular user can be shared with another user of the on-line service based on a privacy setting for the particular user.

Users of an on-line service may share information or interact with each other over a local wireless network. For example, a user of an on-line service may share his/her information (e.g., an email address, a phone number, a profile picture, and so on) with another user nearby using a BLUETOOTH connection between the two user's BLUETOOTH-enabled mobile phones. In particular embodiments, a group of people on a social-networking system may take pictures at a gathering, or event and share the pictures or tag the attendees of the gathering in the pictures automatically, using BLUETOOTH or WiFi-Direct), or a peer-to-peer wireless connection, to establish the list of attendees automatically. In particular embodiments, a group of individuals who are in proximity communicate with ephemeral messaging. The ephemeral messaging may be initiated automatically when users are in proximity with each other. In particular embodiments, the list of users who mutually message each other may be generated automatically based on a peer group. Sharing information and interacting with other users over a local wireless network may enrich a user's experience with the on-line service. However, information sharing over a local wireless network may not adhere to privacy settings of the on-line service as data transmission over the local wireless network is often determined by physical proximity, not by privacy settings of the on-line service. Even without privacy concerns, there may be no established method to ensure that automatic group generation is done when several people in a room are participating in the same communication session and have known relationship to each other. Plainly broadcasting information of a user of the on-line service over a local wireless network may expose the information to people that are not allowed to access the information based on the user's privacy setting. Particular embodiments describe methods for sharing information over a wireless connection while maintaining wireless data privacy. Particular embodiments may maintain wireless data privacy through an on-line service and without manual user input.

Figure 3:
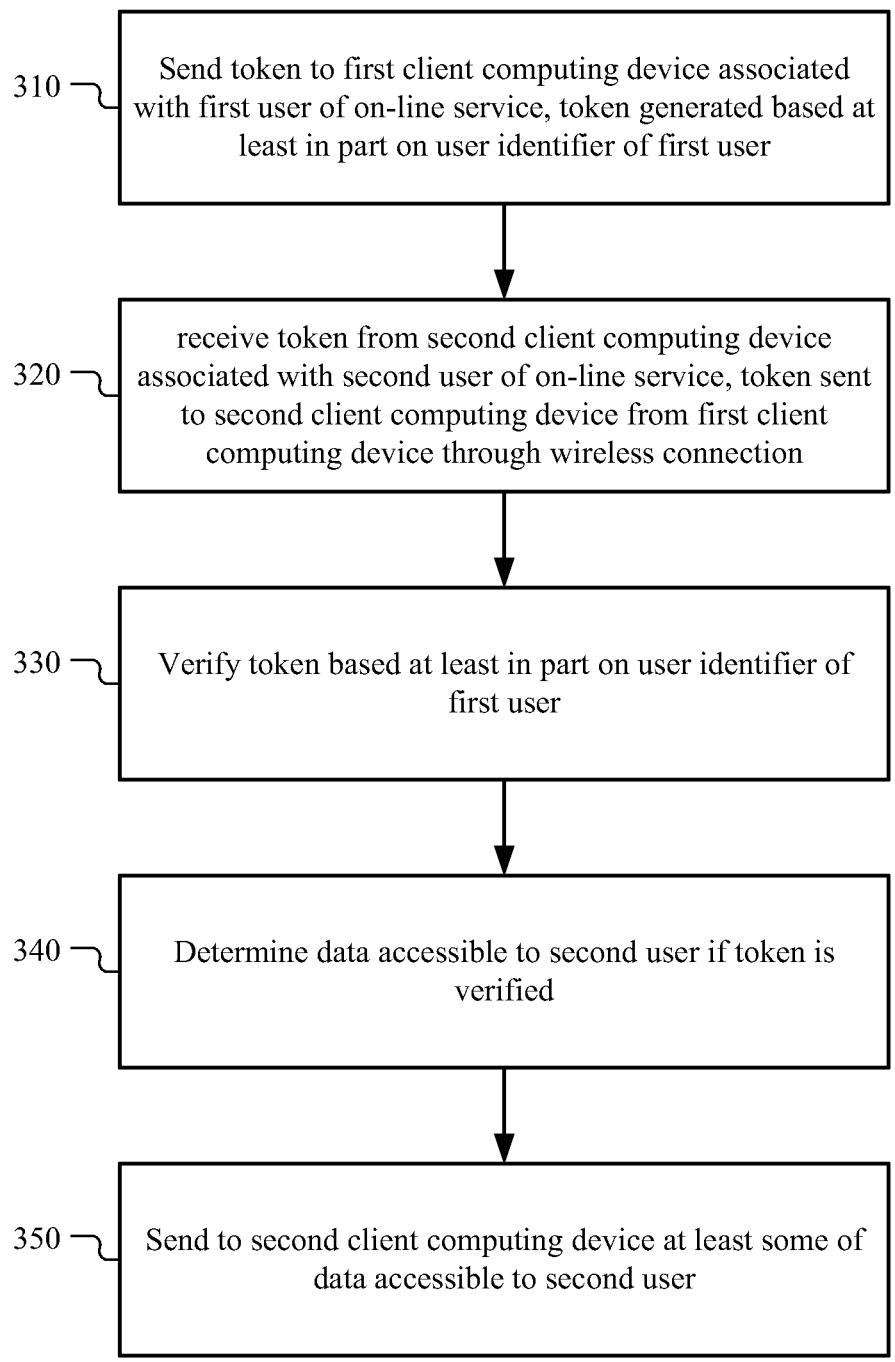
FIG. 3 illustrates an example method for maintaining wireless data privacy.

FIG. 3 illustrates an example method 300 for maintaining wireless data privacy. The method 300 may be implemented by one or more servers of a system providing an on-line service. For example, the method 300 may be implemented by one or more servers of a social-networking system. The method 300 may begin at step 310. In particular embodiments, at step 310, one or more servers of a system providing an on-line service may send a token to a first client computing device associated with a first user of the on-line service. The first user may be an individual or an entity (e.g., a business, a library, an application). The first user may be any suitable object (e.g., a user, a concept) of a social-networking system as described earlier. The first client computing device may be a desktop computer, a laptop computer, a tablet computer, a cellular phone, a smartphone, or any suitable client computing device associated with the first user. The servers may send the token to the first client computing device through a secured connection (e.g., based on Hypertext Transfer Protocol Secure or HTTPS protocol, or Secure Sockets Layer or SSL protocol) between the first client computing device and the servers.

In particular embodiments, the servers may generate the token based at least in part on a user identifier of the first user. For example, the servers may generate the token by encrypting the first user's user identifier of the on-line service. For example, the servers may encrypt the user identifier of the first user based on a one-time pad algorithm. In other embodiments, the servers may generate a number (e.g., a random number, a sequence of random numbers) and send the number to the first client computing device through a secured connection. In particular embodiments, the servers may generate hashes of the user identifier of the first user (e.g., using SHA-256 hash algorithm). In particular embodiments, the servers may provide sessions keys to decrypt encrypted messages from a user. The first client computing device may generate a token by encrypting the user identifier of the first user with the number (e.g., by using the number as an encryption key). Particular embodiments contemplate any suitable methods for generating the token based on the user identifier of the first user.

In particular embodiments, the token may be truncated and used as a MAC (Media Access Control) identifier within a physical wireless protocol. Despite the use of a secured connection at the application layer (e.g., based on HTTPS or SSL protocol), the MAC layer of Wi-Fi 802.11 and BLUETOOTH may utilize a static, unique 48-bit identifier (the MAC address). This MAC address may be tracked in local wireless environments, perhaps compromising the location privacy of the first user. Given the collision probability within a limited user environment is small, it may be possible to use the token generated by the servers as the MAC address. With reasonable token refresh rates, the location of the first user may be less likely traced.

In particular embodiments, the first client computing device may send the token through a wireless connection to a second client computing device associated with a second user of the on-line service. The second user may be an individual or an entity (e.g., a business, a library, an application). The second user may be any suitable object (e.g., a user, a concept) of a social-networking system as described earlier. The wireless connection may be based on a Wi-Fi, BLUETOOTH, peer-to-peer cellular, near-field communication (NFC), infrared (IR), or Radio-Frequency Identification (RFID) protocol. The wireless connection may be encrypted or may not be encrypted. In addition to being sent directly from the first client computing device to the second client computing device, the token may be first sent to another client computing device associated with another user of the on-line service, and be relayed to the second client computing device by the other client computing device. That is, the wireless connection may further comprise a third client computing device associated with a third user of the on-line service. The wireless connection may comprise a peer-to-peer network between a plurality of client computing devices, each being associated with a user of the on-line service. The token may be sent from the first client computing device to the second client computing device through the peer-to-peer network. Particular embodiments contemplate any suitable methods for sending the token from the first client computing device to the second client computing device through a wireless connection. In particular embodiments, at step 320, the servers of the system providing the on-line service may receive the token from the second client computing device associated with the second user of the on-line service. The servers may also receive from the second client computing device a user identifier of the second user. The token (and the second user's user identifier) may be sent from the second client computing device to the servers through a secured connection.

In particular embodiments, at step 330, the servers may verify the token based at least in part on the user identifier of the first user. For example, the servers may decrypt the token and verify that the decrypted token matches the user identifier of the first user. In some embodiments, the token may expire after being verified by the servers. That is, the token may be a one-time token (a "nonce").

In particular embodiments, at step 340, the servers may determine data accessible to the second user if the token is verified. The servers may determine data accessible to the second user based on one or more privacy settings set by the first user (or by the system providing the on-line service). For example, the first user may create a list of users (e.g., a list of user identifiers of the on-line service) who have access to the first user's contact information (e.g., a phone number, an email address, an instant messaging or IM user identifier, and so on). By comparing the second user (e.g., the second user's user identifier) to the list, the servers may determine whether the first user's contact information is accessible to the second user.

For an on-line service such as a social-networking system, the servers may access a social graph of the social-networking system to verify the token. The servers may verify the token further based on a least number of edges traversed in the social graph from a first node corresponding to the first user and a second node corresponding to the second user (i.e., based on the degree of separation between the first and second nodes). For example, the first user may set a privacy setting in that only the first user's first and second-degree friends in the social graph can access the first user's information. The servers may determine that the token is valid if the token is associated with the first user and if the second user is within two degrees of separation from the first user on the social graph. The servers may determine that the first user's information is accessible to the second user if the token is valid.

In particular embodiments, at step 350, the servers may send to the second client computing device at least some of the data accessible to the second user. For example, the servers may send to the second client computing device the first user's user identifier of the on-line service. The second client computing device may display the first user's user identifier in a graphical user interface running on the second client computing device, thus notifying the second user the presence of the first user. For another example, if the servers determine that the first user's contact information is accessible to the second user as described earlier, the servers may transmit some of the contact information (e.g., an email address) of the first user to the second client computing device, causing the second client computing device to display the email address to the second user. For yet another example, the servers may access the social graph described above for a list of common friends between the first and second users of the social-networking system (e.g., users corresponding to nodes that each connects to a first node corresponding to the first user and a second node corresponding to the second user in the social graph). The servers may send the list of common friends to the second client computing device to be displayed to the second user. The servers may also send the list of common friends to the first client computing device to be displayed to the first user. The list of common friends can be a "conversation breaker" between the first and second users (who are in close proximity in distance but are not first-degree friends yet in the social-networking system).

In addition, the servers may send to the first client computing device information related to the second user. For example, the servers may send to the first client computing device (thus the first user) a name and a profile picture of the second user.

If the token is verified, the servers may send to the second client computing device information related to an application associated with the first or second user. For example, the servers may send to the second client computing device information of a game application the first user is currently playing on the first client computing device (e.g., a link to the game application, a particular stage of the game application). The second user may based on the information join the first user in the game application (e.g., in the same game stage as the first user) from the second client computing device. The servers may also cause a change in a state of an application running on the second client computing device. For example, the servers may send a message to the second client computing device, causing a news-feed application running on the second client computing device to re-order the display of news-feed stories such that stories related to the first user are placed on the top of the news-feed displayed by the news-feed application. For another example, the servers may send a message to the second client computing device, causing an address book application running on the second client computing device to display first (e.g., on top of a list of contacts) contact information of the first user.

As described above, instead of plainly broadcasting information of the first user (e.g., a user identifier) over a wireless network, the first client computing device may first receive from the servers of the system providing the on-line service a token associated with the first user, and send (broadcast) the token over a wireless connection to a second client computing device associated with a second user. The second client computing device may then send the token to the servers of the system providing the on-line service, causing the servers to verify that the token is associated with the first user. The servers may then determine data accessible to the second user (if the token is valid), and send at least some of the data accessible to the second user to the second client computing device. Here, the generation, exchange, and verification of the token, the determination of the data accessible to the second user if the token is verified, and sending useful information (data accessible to the second user) for consumption by the second user may happen in the background, without user manual input. Moreover, after the token is verified by the servers, information sharing and interaction between the first and second client computing devices (and between the first and second users) may be through the system providing the on-line service, not necessarily through the peer-to-peer wireless connection between the first and second client computing devices.

In some embodiments, the servers may verify the token based on respective locations associated with the first and second client computing devices. For example, if the second client computing device and the first client computing device are at or near a home location of the first user, the servers may verify the token and determine that the second user can access information of the first user regardless privacy settings of the first user, since the second user is with the first user in the first user's home and thus likely to be a trusted person to the first user. Similarly, if the servers determines that the second client computing device is at or near a work location of the first user, the servers may verify the token and determine that the second user can access information of the first user regardless privacy settings of the first user, since the second user is likely to be a trusted person to the first user. The first (or second) client computing device may determine its location based on Global Positioning System or GPS signals, cellular signal triangulation, Wi-Fi hotspot locations, or any suitable location positioning techniques, and transmit its location to the servers. The servers may determine location information of the first (or second) client computing device based on location check-in activities of the first (or second) user. Particular embodiments contemplate any suitable methods for determining location information of the first and second client computing devices.

Figure 4:
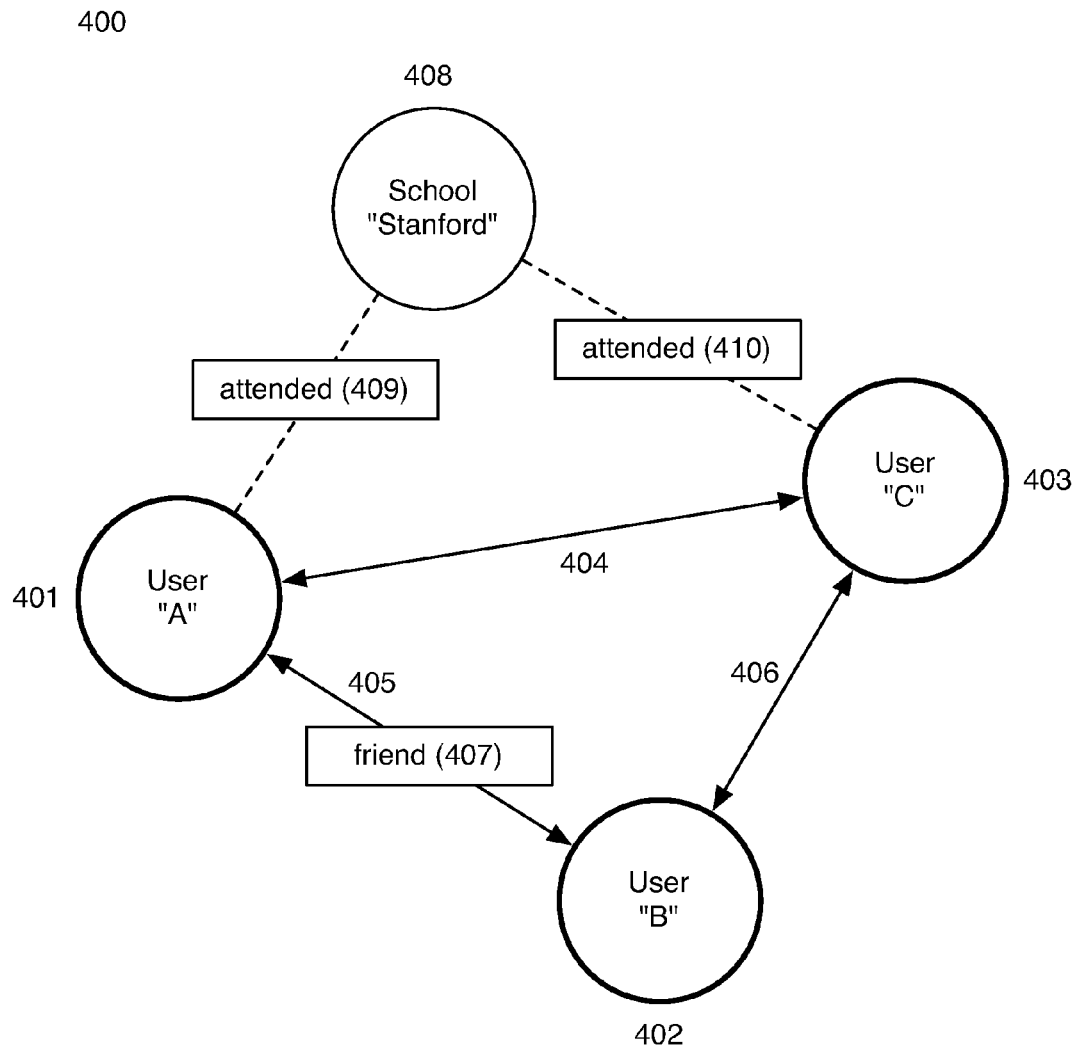
FIG. 4 illustrates an example peer-to-peer network.

FIG. 4 (NEW) illustrates an example peer-to-peer network. Mobile devices of three users 401, 402, and 403 are in physical proximity to each other, while communicating with each other through a peer-to-peer wireless communication protocol such as WiFi Direct, BLUETOOTH, a cellular direct connection, or RFID. Each mobile device of the 3 users receives a token from servers of the social-networking system based on the user's respective user identifier of the social-networking system. The mobile devices all trade tokens through each pairwise connection 404, 405, and 406, or through accumulation and communication of tokens via a smaller subset if the range of the communication protocol was limited. The mobile devices send their respective received tokens from other mobile devices to the social network for translation to a user identifier. Users "A" 401 and "B" 402 are friends (407) on the social-networking system, and therefore each may receive the other person's information automatically (for viewing) on their respective mobile devices. Users "A" and "C" are not friends, but both have designated that shared connections to the same academic institution (could be a shared event or any similarly matched, academic, professional or personal endeavor) would allow the sharing of their social-networking system information in the physical environment. Due to their mutual attendance 409 and 410 at a school "Stanford" 408, the sharing of information could also be automatic, but with additional context to note a shared connection not through friendship. These two users could "friend" each other as a result of a meeting as they are in physical proximity. Although users "B" and "C" are physically in proximity, but having no immediate connections to each other on the social-networking system, their respective mobile devices do not indicate their mutual physical presence on their mobile devices due to their privacy settings on the social-networking system.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 5:
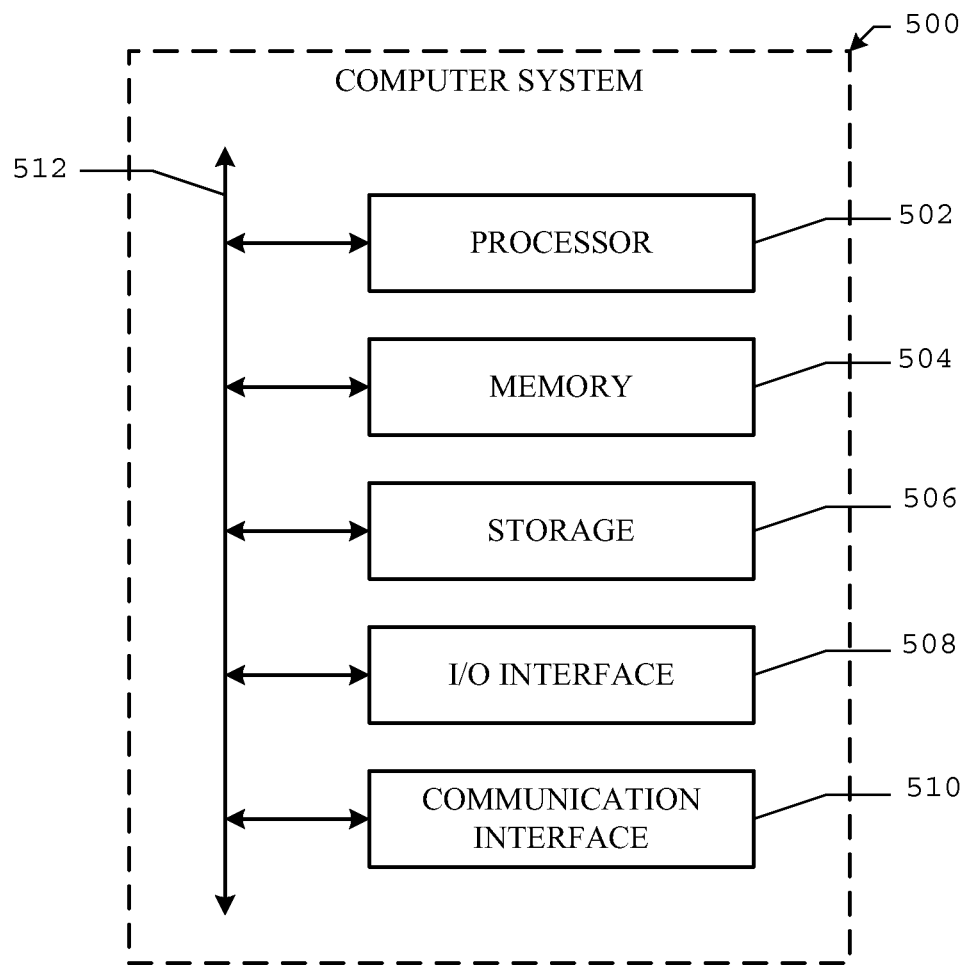
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages

506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:

by one or more servers of a system providing an online service, sending a token to a first client computing device associated with a first user of the online service, the token being generated by the servers based at least in part on a user identifier of the first user;

by the servers, receiving the token from a second client computing device associated with a second user of the online service, the token being sent to the second client computing device from the first client computing device through a wireless connection;

by the servers, verifying the token based at least in part on the user identifier of the first user and a least number of edges traversed in a social graph from a first node corresponding to the first user to a second node corresponding to the second user;

by the servers, determining data accessible to the second user in an event that the token is verified, wherein said determining includes determining a list of nodes in the social graph for access to the second user, the list of nodes representing connections common to both the first node and the second node; and by the servers, sending to the second client computing device at least some of the data accessible to the second user.

2. The method of claim 1, wherein the data accessible to the second user comprises the user identifier of the first user.

3. The method of claim 1, wherein the verifying the token is further based on respective locations associated with the first and second client computing devices, wherein the respective locations are determined by the first and second client computing devices based on global positioning system (GPS), cellular signal triangulation, Wi-Fi hotspot locations, or any combination thereof.

4. The method of claim 1, wherein the token expires after being verified by the servers.

5. The method of claim 1, wherein the sending the token to the first client computing device is through a secured connection between the first client computing device and the servers.

6. The method of claim 1, wherein the wireless connection is based on a Wi-Fi, short-range wireless communications interface, peer-to-peer cellular, or Radio-Frequency Identification (RFID) protocol.

7. The method of claim 1, wherein the wireless connection comprises a third client computing device associated with a third user of the online service.

8. The method of claim 1, wherein:
the system is a social-networking system comprising the social graph comprising a plurality of nodes and edges connecting the nodes, including the first node and the second node; and
the online service is a social-networking service provided by the social-networking system.

9. The method of claim 1, wherein the nodes include at least two user nodes and a concept node, the concept node connected to at least the first node or the second node via an edge representing an activity performed by the first user or the second user.

10. A computer readable data storage memory storing computer-executable instructions that, when executed, cause a computer system to perform a computer-implemented method, the instructions comprising:
instructions for sending, by a system providing an online service, a token to a first client computing device associated with a first user of an online service, wherein the token is generated based at least in part on a user identifier of the first user;
instructions for receiving the token from a second client computing device associated with a second user of the online service, the token being sent to the second client computing device from the first client computing device through a wireless connection;
instructions for verifying the token based at least in part on the user identifier of the first user and a least number of edges traversed in a social graph from a first node corresponding to the first user to a second node corresponding to the second user;
instructions for determining data accessible to the second user in an event that the token is verified, wherein said determining includes determining a list of nodes in the social graph for access to the second user, the list of nodes representing connections common to both the first node and the second node; and
instructions for sending to the second client computing device at least some of the data accessible to the second user.

11. The computer readable data storage memory of claim 10, wherein the data accessible to the second user comprises the user identifier of the first user.

12. The computer readable data storage memory of claim 10, wherein the verifying the token is further based on respective locations associated with the first and second client computing devices, wherein the respective locations are determined by the first and second client computing devices based on global positioning system (GPS), cellular signal triangulation, Wi-Fi hotspot locations, or any combination thereof.

13. The computer readable data storage memory of claim 10, wherein the token expires after being verified.

14. The computer readable data storage memory of claim 10, wherein the sending the token to the first client computing device is through a secured connection with the first client computing device.

15. The computer readable data storage memory of claim 10, wherein the wireless connection is based on a Wi-Fi, short-range wireless communications interface, peer-to-peer cellular, or Radio-Frequency Identification (RFID) protocol.

16. The computer readable data storage memory of claim 10, wherein the wireless connection comprises a third client computing device associated with a third user of the online service.

17. The computer readable data storage memory of claim 10, wherein the online service is a social-networking service provided by a social-networking system.

18. A computer system, comprising:
a data storage component configured to store executable instructions;
one or more processors configured, by the executable instructions, to:
provide an online service;
send a token to a first client computing device associated with a first user of the online service, wherein the token is generated based at least in part on a user identifier of the first user;
receive the token from a second client computing device associated with a second user of the online service, the token being sent to the second client computing device from the first client computing device through a wireless connection;
verify the token based at least in part on the user identifier of the first user and a least number of edges traversed in a social graph from a first node corresponding to the first user to a second node corresponding to the second user;
determine data accessible to the second user in an event that the token is verified by at least determining a list of nodes in the social graph for access to the second user, the list of nodes representing connections common to both the first node and the second node; and
send to the second client computing device at least some of the data accessible to the second user.

19. The computer system of claim 18, wherein the one or more processors are configured to expire the token after the token is verified.

* * * * *